(12) United States Patent
Deng

(10) Patent No.: US 11,614,994 B2
(45) Date of Patent: *Mar. 28, 2023

(54) METHOD, APPARATUS AND ELECTRONIC DEVICE FOR BLOCKCHAIN-BASED TRANSACTION CONSENSUS PROCESSING

(71) Applicant: Advanced New Technologies Co., Ltd., Grand Cayman (KY)

(72) Inventor: Fuxi Deng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 62 days.

This patent is subject to a terminal disclaimer.

(21) Appl. No.: 17/240,467

(22) Filed: Apr. 26, 2021

(65) Prior Publication Data

US 2021/0248030 A1  Aug. 12, 2021

Related U.S. Application Data

(63) Continuation of application No. 17/076,526, filed on Oct. 21, 2020, now Pat. No. 11,023,309, which is a
(Continued)

(30) Foreign Application Priority Data

Aug. 31, 2018 (CN) .......................... 201811015599.0

(51) Int. Cl.
   *H03M 13/15* (2006.01)
   *H04L 9/06* (2006.01)
   (Continued)

(52) U.S. Cl.
   CPC .............. *G06F 11/10* (2013.01); *G06F 16/27* (2019.01); *H03M 7/60* (2013.01); *H03M 13/154* (2013.01);
   (Continued)

(58) Field of Classification Search
   CPC ....... H04L 9/08; H04L 9/0891; H04L 9/3242; H04L 9/3247; H04L 9/3236; H04L 65/608; H04L 9/0836
   See application file for complete search history.

(56) References Cited

U.S. PATENT DOCUMENTS

| 10,901,660 B1 | 1/2021 | Frandzel et al. |
| 11,321,718 B1 | 5/2022 | Narendranathan et al. |

(Continued)

FOREIGN PATENT DOCUMENTS

| CN | 105741095 A | 7/2016 |
| CN | 105847279 A | 8/2016 |

(Continued)

OTHER PUBLICATIONS

Miller et al., "The Honey Badger of BFT Protocols," *Proceedings of the 2016 ACM SIGSAC Conference on Computer and Communications Security*, Feb. 28, 2016, pp. 1-21.
(Continued)

*Primary Examiner* — Iqbal Zaidi
(74) *Attorney, Agent, or Firm* — Seed IP Law Group LLP

(57) ABSTRACT

A method for blockchain-based transaction consensus processing is provided. Node devices in a blockchain include at least one primary node device and several secondary node devices, the primary node device fragments proposed transaction data into a specified number of data fragments based on an erasure code algorithm, and the method includes: receiving a data fragment of the transaction data that is sent by the primary node device in a unicast mode, where respective data fragments sent by the primary node device to individual node devices in a unicast mode are different from one another; broadcasting the received data fragment to other node devices in the blockchain, and receiving data fragments of the transaction data that are broadcast by the other node devices; determining whether the number of
(Continued)

received data fragments of the transaction data reaches an erasure code recovery threshold; and if so, performing data recovery on the received data fragments based on an erasure code reconstruction algorithm to obtain original content of the transaction data, to complete consensus processing with respect to the original content of the transaction data.

20 Claims, 5 Drawing Sheets

Related U.S. Application Data continuation of application No. PCT/CN2019/096269, filed on Jul. 17, 2019.

(51) Int. Cl.
  *H04L 9/14* (2006.01)
  *H04L 9/00* (2022.01)
  *G06F 11/10* (2006.01)
  *G06F 16/27* (2019.01)
  *H03M 7/30* (2006.01)

(52) U.S. Cl.
  CPC .............. *H04L 9/0637* (2013.01); *H04L 9/14* (2013.01); *H04L 9/50* (2022.05)

(56) References Cited

U.S. PATENT DOCUMENTS

| | | | |
|---|---|---|---|
| 2016/0173364 A1 | 6/2016 | Pitio et al. | |
| 2017/0083907 A1 | 3/2017 | McDonough et al. | |
| 2017/0140375 A1 | 5/2017 | Kunstel | |
| 2017/0228822 A1 | 8/2017 | Creighton, IV et al. | |
| 2017/0344987 A1 | 11/2017 | Davis | |
| 2018/0060836 A1 | 3/2018 | Castagna | |
| 2018/0139278 A1 | 5/2018 | Bathen et al. | |
| 2018/0189333 A1 | 7/2018 | Childress et al. | |
| 2018/0191502 A1 | 7/2018 | Karame | |
| 2018/0191503 A1 | 7/2018 | Alwar et al. | |
| 2018/0241573 A1 | 8/2018 | Ramathal et al. | |
| 2018/0276745 A1 | 9/2018 | Paolini-Subramanya et al. | |
| 2019/0026146 A1 | 1/2019 | Peffers et al. | |
| 2019/0058581 A1 | 2/2019 | Wood et al. | |
| 2019/0165943 A1 | 5/2019 | Chari et al. | |
| 2019/0171365 A1 | 6/2019 | Power et al. | |
| 2019/0243980 A1 | 8/2019 | Inamdar et al. | |
| 2019/0394175 A1 | 12/2019 | Zhang et al. | |
| 2020/0127835 A1* | 4/2020 | Fletcher | H04L 9/0637 |

FOREIGN PATENT DOCUMENTS

| | | |
|---|---|---|
| CN | 106529951 A | 3/2017 |
| CN | 106603198 A | 4/2017 |
| CN | 106656974 A | 5/2017 |
| CN | 107728941 A | 2/2018 |
| CN | 107948334 A | 4/2018 |
| CN | 108199842 A | 6/2018 |
| CN | 108389129 A | 8/2018 |
| CN | 109345386 A | 2/2019 |
| CN | 109379397 A | 2/2019 |
| TW | 201138356 A1 | 11/2011 |
| TW | 201810152 A | 3/2018 |
| WO | 2015/173434 A1 | 11/2015 |

OTHER PUBLICATIONS

Miller et al., "The Honey Badger of BFT Protocols," *Proceedings of the 2016 ACM SIGSAC Conference on Computer and Communications Security*, Vienna, Austria, Oct. 24-28, 2016, pp. 31-42. https://dl.acm.org/doi/10.1145/2976749.2978399.

International Search Report and Written Opinion, dated Feb. 9, 2022, for International Application No. 11202010530P, 13 pages.

Hung et al., "Study and Realization of An Improved PBFT Algorithm As An Ethereum Consensus Mechanism," Computer Applications and Software. 34(10) : 288-297, 2017.

Dai et al., "A Low Storage Room Requirement Framework for Distributed Ledger in Blockchain," *IEEE*. vol. 6 : 22970-22975, 2018.

Cachin et al., "Asynchronous Verifiable Information Dispersal," *IEEE Symposium on Reliable Distributed Systems*, Orlando, Florida, USA, Oct. 26-28, 2005, pp. 503-504.

Goodson et al., "Efficient Byzantine-tolerant erasure-coded storage," *IEEE International Conference on Dependable Systems and Networks*, Florence, Italy, Jun. 28-Jul. 1, 2004, pp. 121-130.

Miller et al., "The Honey Badger of BFT Protocols," *ACM SIGSAC Conference On Computer and Communication Security*, Vienna, Austria, Oct. 24-28, 2016, pp. 31-42.

Perard et al., "Erasure code-based Low Storage Blockchain Node," IEEE International Conference on Internet of Things, Green Computing and Communications, Cyber, Physical and Social Computing, Smart Data, Blockchain, Computer and Information Technology, Congress on Cybermatics, Jul. 30-Aug. 3, 2018, pp. 1622-1627.

\* cited by examiner

METHOD, APPARATUS AND ELECTRONIC DEVICE FOR BLOCKCHAIN-BASED TRANSACTION CONSENSUS PROCESSING

BACKGROUND

Technical Field

One or more implementations of the present specification relate to the field of blockchain technologies, and in particular, to a method, an apparatus and an electronic device for blockchain-based transaction consensus processing.

Description of the Related Art

Blockchain technology, also referred to as distributed ledger technology, is an emerging technology that several computing devices participate in "accounting" to jointly maintain a complete distributed database. Blockchain technology is characterized by decentralization, openness, and transparency, each computing device can participate in database recording, and data can be synchronized rapidly between the computing devices. Therefore, blockchain technology has been widely applied in many fields.

BRIEF SUMMARY

The present specification provides a method for blockchain-based transaction consensus processing. Node devices in a blockchain include at least one primary node device and several secondary node devices, the primary node device fragments proposed transaction data into a specified number of data fragments based on an erasure code algorithm, and the method includes:

receiving a data fragment of the transaction data that is sent by the primary node device in a unicast mode, where respective data fragments sent by the primary node device to individual node devices in a unicast mode are different from one another;

broadcasting the received data fragment to other node devices in the blockchain, and receiving data fragments of the transaction data that are broadcast by the other node devices;

determining whether the number of received data fragments of the transaction data reaches an erasure code recovery threshold; and in response to determining that the number of received data fragments of the transaction data reaches the erasure code recovery threshold, performing data recovery on the received data fragments based on an erasure code reconstruction algorithm to obtain original content of the transaction data, to complete consensus processing with respect to the original content of the transaction data.

Optionally, the method further includes:

determining whether a current node device is elected as the primary node device;

in response to determining that the current node device is elected as the primary node device, fragmenting the proposed transaction data into the specified number of data fragments based on the erasure code algorithm; and separately sending the specified number of data fragments to each of the other node devices in a unicast mode.

Optionally, a consensus algorithm equipped on the blockchain is a practical Byzantine fault tolerance (PBFT) algorithm; and where receiving the data fragment of the transaction data that is sent by the primary node device in a unicast mode includes:

receiving a pre-prepare message sent by the primary node device in a unicast mode, where the pre-prepare message includes a data fragment of the transaction data; and obtaining and storing the data fragment included in the pre-prepare message.

Optionally, broadcasting the received data fragment to the other node devices in the blockchain includes:

broadcasting a prepare message to the other node devices in the blockchain, where the prepare message includes the received data fragment, so that when receiving the prepare message, the other node devices obtain and store the data fragment included in the prepare message.

Optionally, fragmenting the proposed transaction data into the specified number of data fragments based on the erasure code algorithm includes:

performing compression processing on the proposed transaction data based on a predetermined compression algorithm; and fragmenting the compressed transaction data into the specified number of data fragments based on the erasure code algorithm; and where performing data recovery on the received data fragments based on the erasure code reconstruction algorithm to obtain the original content of the transaction data includes:

performing data recovery on the received data fragments based on the erasure code reconstruction algorithm, to obtain the compressed transaction data; and performing decompression processing on the recovered transaction data based on a decompression algorithm corresponding to the compression algorithm, to obtain the original content of the transaction data.

Optionally, fragmenting the proposed transaction data into the specified number of data fragments based on the erasure code algorithm includes:

performing encryption processing on the proposed transaction data based on a predetermined encryption algorithm and an encryption key;

fragmenting the encrypted transaction data into the specified number of data fragments based on the erasure code algorithm; and where performing data recovery on the received data fragments based on the erasure code reconstruction algorithm to obtain the original content of the transaction data includes:

performing data recovery on the received data fragments based on the erasure code reconstruction algorithm, to obtain the encrypted transaction data; and performing decryption processing on the recovered transaction data based on a decryption algorithm corresponding to the encryption algorithm and a decryption key corresponding to the encryption key, to obtain the original content of the transaction data.

Optionally, the encryption algorithm is a threshold encryption algorithm, the decryption algorithm is a threshold decryption algorithm corresponding to the threshold encryption algorithm, the decryption key is fragmented into a specified number of sub-keys, and each of the sub-keys is held by a respective node device; and performing decryption processing on the recovered transaction data based on the decryption algorithm corresponding to the encryption algorithm and the decryption key corresponding to the encryption key includes:

collecting sub-keys held by the other node devices;

determining whether the number of collected sub-keys reaches a predetermined decryption threshold; and in response to determining that the number of collected sub-keys reaches the predetermined decryption threshold, reconstructing the decryption key based on the collected sub-keys, and performing decryption processing on the recovered transaction data based on the threshold decryption algorithm corresponding to the threshold encryption algorithm and the decryption key.

Optionally, the transaction data proposed by the primary node device is a transaction list constructed using to-be-negotiated transactions broadcast by user clients in a current consensus period of the primary node device, and the specified number is a total number of node devices in the blockchain.

Optionally, the blockchain is a consortium blockchain.

The present specification further provides an apparatus for blockchain-based transaction consensus processing. Node devices in a blockchain include at least one primary node device and several secondary node devices, the primary node device fragments proposed transaction data into a specified number of data fragments based on an erasure code algorithm, and the apparatus includes:

a receiving module, configured to receive a data fragment of the transaction data that is sent by the primary node device in a unicast mode, where respective data fragments sent by the primary node device to individual node devices in a unicast mode are different from one another;

a sending module, configured to broadcast the received data fragment to other node devices in the blockchain, and receive data fragments of the transaction data that are broadcast by the other node devices;

a determining module, configured to determine whether the number of received data fragments of the transaction data reaches an erasure code recovery threshold; and a recovery module, configured to, in response to determining that the number of received data fragments of the transaction data reaches the erasure code recovery threshold, perform data recovery on the received data fragments based on an erasure code reconstruction algorithm to obtain original content of the transaction data, to complete consensus processing with respect to the original content of the transaction data.

Optionally, the apparatus further includes:

a fragmentation module, configured to determine whether the current node device is elected as the primary node device; and in response to determining that the current node device is elected as the primary node device, fragment the proposed transaction data into the specified number of data fragments based on the erasure code algorithm; and the sending module is further configured to:

separately send the specified number of data fragments to each of the other node devices in a unicast mode.

Optionally, a consensus algorithm equipped on the blockchain is a PBFT algorithm; and the receiving module is configured to:

receive a pre-prepare message sent by the primary node device in a unicast mode, where the pre-prepare message includes a data fragment of the transaction data; and obtain and store the data fragment included in the pre-prepare message.

Optionally, the sending module is configured to:

broadcast a prepare message to the other node devices in the blockchain, where the prepare message includes the received data fragment, so that when receiving the prepare message, the other node devices obtain and store the data fragment included in the prepare message.

Optionally, the fragmentation module is configured to:

perform compression processing on the proposed transaction data based on a predetermined compression algorithm; and fragment the compressed transaction data into the specified number of data fragments based on the erasure code algorithm; and the recovery module is configured to:

perform data recovery on the received data fragments based on the erasure code reconstruction algorithm, to obtain the compressed transaction data; and perform decompression processing on the recovered transaction data based on a decompression algorithm corresponding to the compression algorithm, to obtain the original content of the transaction data.

Optionally, the fragmentation module is configured to:

perform encryption processing on the proposed transaction data based on a predetermined encryption algorithm and an encryption key;

fragment the encrypted transaction data into the specified number of data fragments based on the erasure code algorithm; and the recovery module is configured to:

perform data recovery on the received data fragments based on the erasure code reconstruction algorithm, to obtain the encrypted transaction data; and perform decryption processing on the recovered transaction data based on a decryption algorithm corresponding to the encryption algorithm and a decryption key corresponding to the encryption key, to obtain the original content of the transaction data.

Optionally, the encryption algorithm is a threshold encryption algorithm, the decryption algorithm is a threshold decryption algorithm corresponding to the threshold encryption algorithm, the decryption key is fragmented into a specified number of sub-keys, and each of the sub-keys is held by a respective node device, and the recovery module is further configured to:

collect sub-keys held by the other node devices;

determine whether the number of collected sub-keys reaches a predetermined decryption threshold; and in response to determining that the number of collected sub-keys reaches the predetermined decryption threshold, reconstruct the decryption key based on the collected sub-keys, and perform decryption processing on the recovered transaction data based on the threshold decryption algorithm corresponding to the threshold encryption algorithm and the decryption key.

Optionally, the transaction data proposed by the primary node device is a transaction list constructed using to-be-negotiated transactions broadcast by user clients in a current consensus period of the primary node device, and the specified number is a total number of node devices in the blockchain.

Optionally, the blockchain is a consortium blockchain.

The present specification further provides an electronic device, including:

a processor; and a memory, configured to store machine-executable instructions, where by reading and executing the machine-executable instructions stored in the memory and corresponding to control logic of blockchain-based transaction consensus processing, the processor is configured to:

receive a data fragment of transaction data that is sent by a primary node device in a unicast mode, where node devices in a blockchain include at least one primary node device and several secondary node devices, the primary node device fragments the proposed transaction data into a specified number of data fragments, and respective data fragments sent by the primary node device to individual node devices in a unicast mode are different from one another;

broadcast the received data fragment to other node devices in the blockchain, and receive data fragments of the transaction data that are broadcast by the other node devices;

determine whether the number of received data fragments of the transaction data reaches an erasure code recovery threshold; and in response to determining that the number of received data fragments of the transaction data reaches the erasure code recovery threshold, perform data recovery on the received data fragments based on an erasure code reconstruction algorithm to obtain original content of the transaction data, to complete consensus processing with respect to the original content of the transaction data.

According to the above technical solutions, when proposing the to-be-negotiated transaction data to the secondary node devices, the primary node device fragments the to-be-negotiated transaction data based on the erasure code algorithm before transmission.

As such, in one aspect, at the time when the primary node device proposes the transaction data to the secondary node devices, the primary node device no longer needs to broadcast the complete transaction data to the secondary node devices, but can send data fragment(s) to each secondary node device in a unicast mode. Thus, data transmission bandwidth consumed for transmitting the to-be-negotiated transaction data to the node devices participating in the consensus can be significantly reduced, and the to-be-negotiated transaction data can be transmitted to the secondary node devices in a short time to complete the consensus, thereby improving consensus processing efficiency.

In another aspect, because the primary node device sends only data fragment(s) of the transaction data to each secondary node device in a unicast mode, the primary node device cannot learn of the complete content of a complete transaction that the data fragment belongs. Therefore, the following case can be effectively avoided: The primary node device selectively sends some specific transactions to other node device(s) participating in the consensus in a unicast mode, and conducts a selective consensus on some specific transactions. As such, fairness of the consensus can be ensured, and the primary node device can be prevented from doing "evil" through the selective consensus.

DETAILED DESCRIPTION

Figure 1:
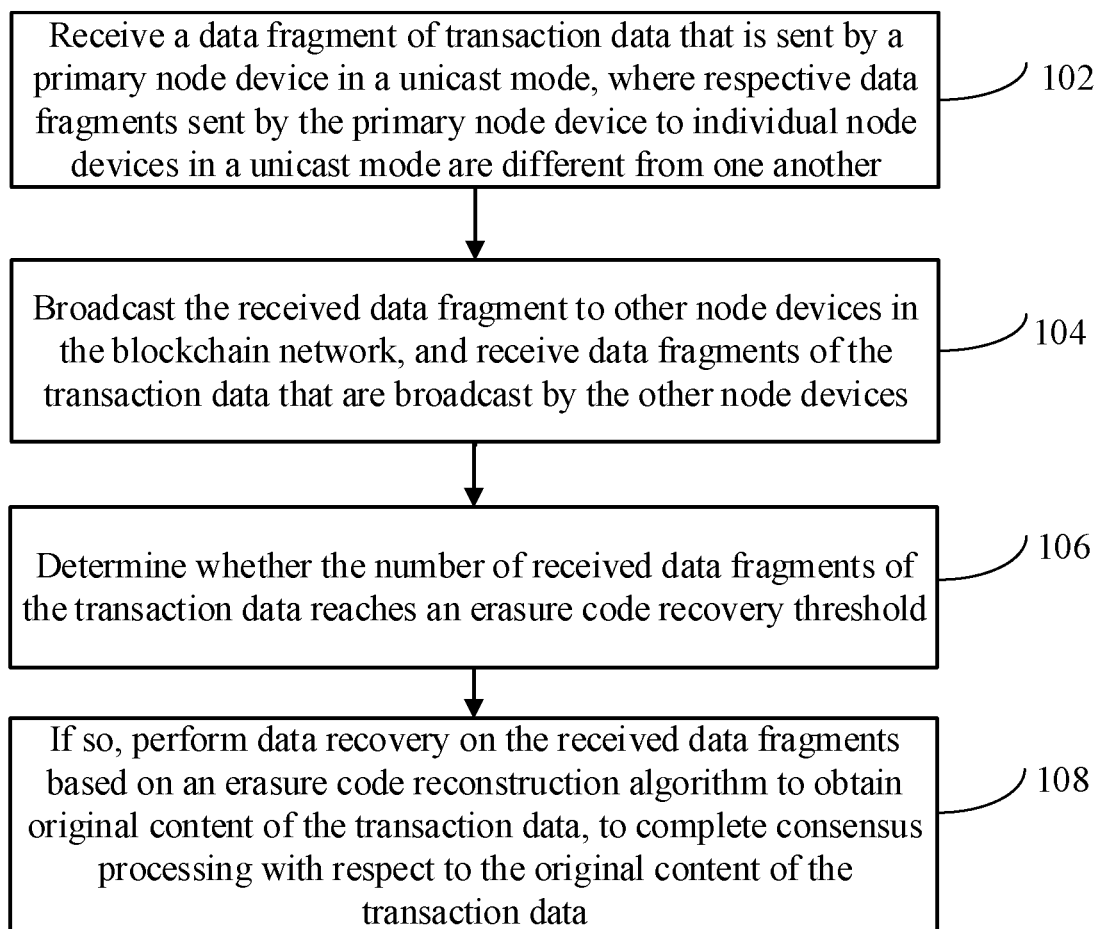
FIG. 1 is a flowchart illustrating a method for blockchain-based transaction consensus processing, according to an example implementation.

The present specification describes that, in a course of blockchain consensus processing, an erasure code algorithm is introduced to fragment to-be-negotiated transaction data before transmission, to reduce data transmission bandwidth consumed for transmitting the to-be-negotiated transaction data to node devices participating in the consensus and to improve consensus efficiency. As used herein, a blockchain network can refer to the interconnected partnership of computing nodes that implement particular type(s) of blockchain technology.

During implementation, before each round of consensus in the blockchain starts, one primary node device can be elected from node devices in the blockchain (for example, one primary node device is re-elected for each round of consensus and other node devices serve as secondary node devices), and the primary node device initiates a transaction consensus, and is responsible for creating the latest block for the blockchain based on consensus-agreed transaction data.

When initiating a round of transaction consensus, the primary node device can first fragment proposed to-be-negotiated transaction data into a number of data fragments based on an erasure code algorithm, and then send the data fragments obtained through fragmentation to the other node devices separately (e.g., in a unicast mode). The respective data fragments sent by the primary node device to individual node devices in a unicast mode are different from one another.

In some embodiments, the transaction data is fragmented into a number of distinct data fragments in accordance with a total number of node devices in the blockchain. For example, the number of distinct data fragments resulting from the fragmenting can be the same as the total number of other node devices in the blockchain, and each distinct data fragment is sent by the primary node to a different node device.

In some embodiments, the transaction data is fragmented into a smaller or greater number of distinct data fragments. In some embodiments, the primary node device refrains from sending any data fragment to certain node device(s). In some embodiments, the primary node device sends two or more distinct data fragments to a node device.

Second, upon receiving a data fragment of the transaction data that is sent by the primary node device in a unicast mode, each secondary node device can continue to broadcast the received data fragment to other node devices in the blockchain, and can further collect data fragments broadcast by the other node devices.

Finally, any node device (including the primary node device and the secondary node devices) in the blockchain can determine whether the number of collected data fragments of the transaction data reaches an erasure code recovery threshold defined when the erasure code algorithm is used to fragment the transaction data. If so, it indicates that the currently collected data fragments are sufficient to recover original content of the transaction data. In this case, data recovery can be performed on the collected data fragments based on an erasure code reconstruction algorithm to obtain the original content of the transaction data, to complete consensus processing with respect to the original content of the transaction data.

According to the above technical solutions, when proposing the to-be-negotiated transaction data to the secondary node devices, the primary node device fragments the to-be-negotiated transaction data based on the erasure code algorithm before transmission.

As such, in one aspect, at the time when the primary node device proposes the transaction data to the secondary node devices, the primary node device no longer needs to broadcast the complete transaction data to the secondary node devices, but can send data fragment(s) to each secondary node device in a unicast mode. Thus, data transmission bandwidth consumed for transmitting the to-be-negotiated transaction data to the node devices participating in the consensus can be significantly reduced, and the to-be-negotiated transaction data can be transmitted to the secondary node devices in a short time to complete the consensus, thereby improving consensus processing efficiency.

In another aspect, because the primary node device sends only data fragment(s) of the transaction data to each secondary node device in a unicast mode, the primary node device cannot learn of the complete content of a complete transaction that the data fragment belongs. Therefore, the following case can be effectively avoided: The primary node device selectively sends some specific transactions to other node device(s) participating in the consensus in a unicast mode, and conducts a selective consensus on some specific transactions. As such, fairness of the consensus can be ensured, and the primary node device can be prevented from doing "evil" through the selective consensus.

The following describes the present specification by using specific implementations with reference to specific application scenarios.

FIG. 1 shows a method for blockchain-based transaction consensus processing, according to an implementation of the present specification. The method is applicable to any suitable node device in a blockchain. Node devices in the blockchain include at least one primary node device and several secondary node devices. The primary node device fragments proposed transaction data into a specified (e.g., manually-determined or automatically-determined) number of data fragments based on an erasure code algorithm. The following steps are performed.

Step 102: Receive a data fragment of the transaction data that is sent by the primary node device in a unicast mode, where respective data fragments sent by the primary node device to individual node devices in a unicast mode are different from one another.

Step 104: Broadcast the received data fragment to other node devices in the blockchain, and receive data fragments of the transaction data that are broadcast by the other node devices.

Step 106: Determine whether the number of received data fragments of the transaction data reaches an erasure code recovery threshold.

Step 108: If so, perform data recovery on the received data fragments based on an erasure code reconstruction algorithm to obtain original content of the transaction data, to complete consensus processing with respect to the original content of the transaction data.

The blockchain described in the present specification can specifically include a private blockchain, a public blockchain, a consortium blockchain, or the like. No specific limitation is provided in the present specification.

For example, in a scenario, a specific blockchain can be a consortium blockchain that includes the following member devices: a server of a third-party payment platform, a server of a domestic bank, a server of an overseas bank, and several user node devices. An operator of the consortium blockchain can deploy consortium blockchain-based online services such as cross-border transfer and asset transfer online based on the consortium blockchain.

A transaction described in the present specification refers to data that is created by a user by using a client of a blockchain and needs to be eventually published to a distributed database of the blockchain.

Transactions in the blockchain include a transaction in a narrow sense and a transaction in a broad sense. A transaction in the narrow sense refers to value transfer published by a user to the blockchain. For example, in a conventional bitcoin blockchain network, the transaction can be a transfer initiated by the user in the blockchain. A transaction in the broad sense refers to service data with a service intention that is published by a user to the blockchain. For example, an operator can create a consortium blockchain based on an actual service requirement, and deploy some other types of online services (for example, a rental service, a vehicle scheduling service, an insurance claim service, a credit service, and a medical service) that are not related to value transfer in the consortium blockchain. In such a consortium blockchain, the transaction can be a service message or service request with a service intention that is published by a user to the consortium blockchain.

It should be noted that a consensus algorithm equipped on the blockchain is not specifically limited in the present specification. In practice, specifically, a Byzantine fault tolerance algorithm can be used as the consensus algorithm, or a non-Byzantine fault tolerance algorithm can be used as the consensus algorithm.

The Byzantine fault tolerance algorithm refers to a distributed fault tolerance algorithm, for example, a PBFT algorithm, in which a Byzantine node (namely, an evil node) needs to be considered in a distributed network including several node devices. If the Byzantine fault tolerance algorithm is used to perform consensus processing in the blockchain network, it is considered that both evil node(s) and faulty node(s) exist in the blockchain. Correspondingly, the non-Byzantine fault tolerance algorithm refers to a distributed fault tolerance algorithm, for example, a raft algorithm, in which no Byzantine node is considered in a distributed network including several node devices. If the non-Byzantine fault tolerance algorithm is used to perform consensus processing in the blockchain network, it is considered that no evil node exists and only faulty node(s) exists in the blockchain.

The transaction data proposed by the primary node device described in the present specification specifically refers to to-be-negotiated transaction(s) that is collected by the primary node device and submitted by user client(s) by using connected node device(s). For example, in an implementation, a user client can broadcast a transaction initiated by the user in the blockchain by using a connected node device.

In practice, the primary node device can initiate a consensus for a single transaction, or can initiate a consensus for a created transaction list.

For example, in an implementation, a user client can broadcast, in the blockchain network, a transaction submitted by a user. The primary node device can collect to-be-negotiated transactions broadcast by various user clients in the blockchain network in a consensus time period of a current round, then create a transaction list based on the collected to-be-negotiated transactions, and use the transaction list as proposed transaction data for transmitting to other node devices.

The following provides descriptions by using an example where the blockchain is a consortium blockchain, and the consortium blockchain uses the PBFT algorithm as the consensus algorithm to perform consensus processing on the transaction list proposed by the primary node device.

In the present specification, based on three existing phases, i.e., pre-prepare, prepare, and commit in the PBFT algorithm, an erasure code algorithm can be introduced to optimize and improve an existing transaction data transmission mechanism in the pre-prepare and prepare phases of the PBFT algorithm, so as to reduce data transmission bandwidth for performing consensus interaction between the primary node device and the secondary node devices and improve consensus processing efficiency.

Figure 2:
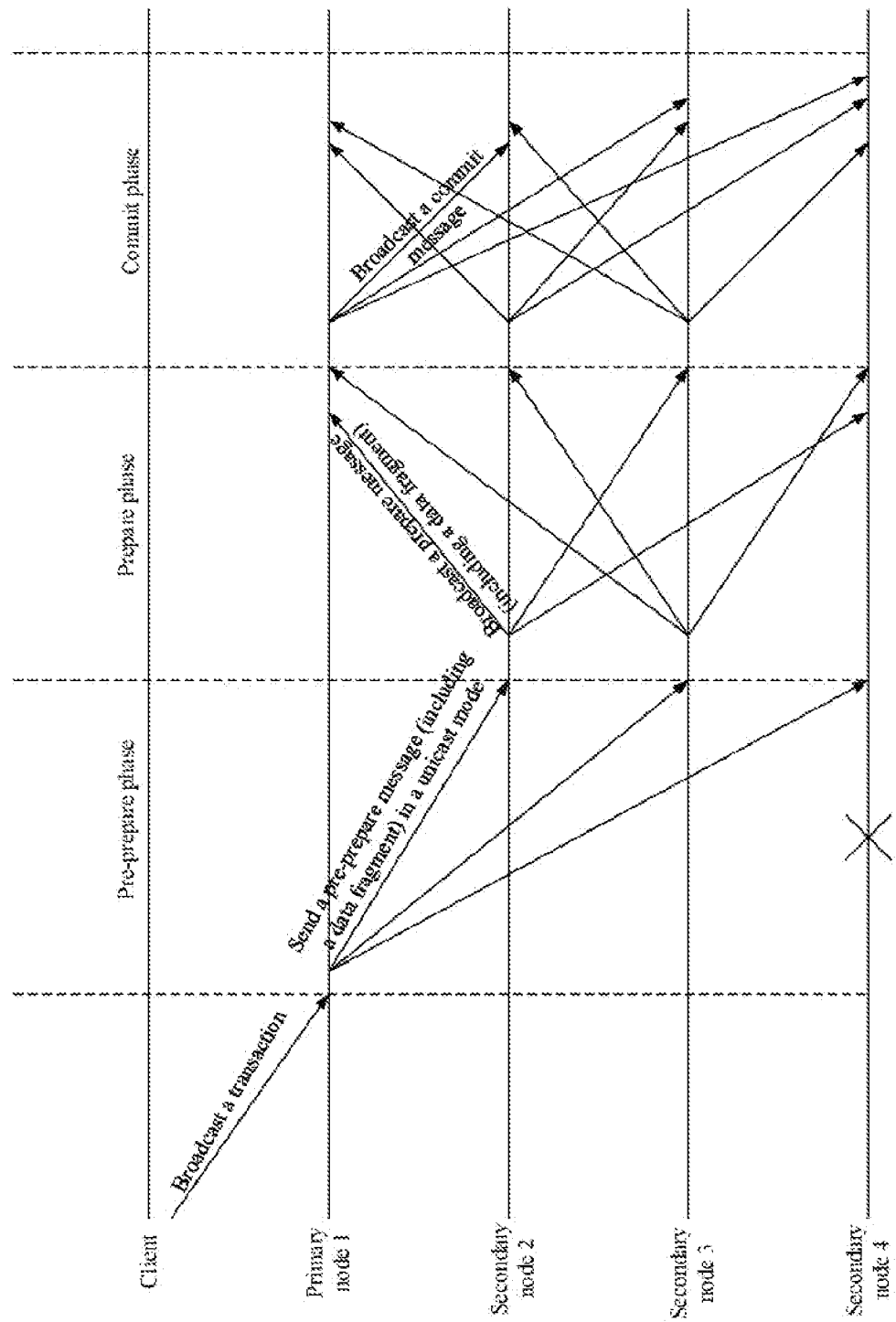
FIG. 2 is a schematic diagram illustrating interactions in three phases of an optimized PBFT algorithm, according to an example implementation.

FIG. 2 is a schematic diagram illustrating interactions in the three phases of an optimized PBFT algorithm, according to the present specification.

As shown in FIG. 2, before each round of consensus in a consortium blockchain starts, one primary node device can be elected from node devices in the consortium blockchain.

For example, based on the PBFT algorithm, before each round of consensus in the consortium blockchain starts, one primary node device can be calculated for the current round according to the following equation:

$$P = v \bmod R,$$

where P represents a calculated index number of the primary node device of the current round of consensus and v represents a current view index number of the consortium blockchain. The view index number is usually an integer that grows consecutively, representing the number of rounds of successfully completed consensuses in the consortium blockchain. For example, after a round of consensus is successfully completed, and the elected primary node device successfully writes a new block into the consortium blockchain, the view index number can automatically increase by 1. R represents a total number of node devices in the consortium blockchain.

Each node device can perform the above calculation, and perform matching between the calculated index number of the primary node device and an index number of the current device to determine whether the current device is elected as the primary node device.

In one aspect, if a node device determines that the current device is not elected as the primary node device, the node device can broadcast received transaction(s) that is submitted by client(s) to the node devices in the consortium blockchain.

In another aspect, if a node device determines that the current device is elected as the primary node device, the node device can collect transactions broadcast by user clients in a consensus time period of the current round, and create a transaction list based on the collected transactions. In this case, the created transaction list is the transaction data that is proposed by the primary node device for consensus processing.

Further, the primary node device can fragment the proposed transaction list based on an erasure code algorithm, to fragment the transaction list into a specified number of data fragments.

It should be noted that the number of data fragments obtained by fragmenting the transaction list can be consistent with the total number of node devices in the consortium blockchain. For example, assuming that there are N node devices in the consortium blockchain, the transaction list can be fragmented into N data fragments.

A specific process of fragmenting the transaction list based on the erasure code algorithm is omitted for simplicity in the present specification. A person skilled in the art can refer to descriptions in related technologies when implementing the technical solutions of the present specification.

For example, assume that the transaction list is fragmented into N data fragments based on the erasure code algorithm, and the N data fragments include K data blocks and M check blocks. M represents the number of fault-tolerable data fragments in the N data fragments. K represents the minimum number (namely, an erasure code recovery threshold) of data fragments required to recover the original transaction list. In other words, by using any K data fragments in the N data fragments, original content of the transaction list can be recovered by using an erasure code reconstruction algorithm (namely, an inverse algorithm of the erasure code algorithm).

When the primary node device completes fragmenting the transaction list based on the erasure code algorithm, the primary node device can send a pre-prepare message to each secondary node device, to separately send the data fragments obtained through fragmentation to the other node devices. In the present specification, the respective data fragments sent by the primary node device to individual secondary node devices need to be different.

Based on an existing PBFT protocol, the primary node device can add the complete transaction list to a pre-prepare message, and then broadcast the pre-prepare message to node devices in the consortium blockchain, to transmit the complete transaction list to secondary node devices that need to participate in the transaction consensus in the consortium blockchain.

However, based on an existing transaction data transmission mechanism of the PBFT protocol, because the pre-prepare message needs to include the complete transaction list, a large number of data copies are generated when the pre-prepare message is being broadcast. For example, based on the total number N of node devices in the consortium blockchain, N copies of the pre-prepare message need to be made, and then are broadcast. Therefore, in the PBFT protocol, a large amount of network bandwidth of the consortium blockchain is occupied to transmit the transaction data, and a relatively high requirement is imposed on bandwidth performance of the consortium blockchain. Once the bandwidth performance of the consortium blockchain is insufficient, the to-be-negotiated transaction list cannot be transmitted to other secondary node devices participating in the consensus in a short time.

In view of this, in the present specification, the existing transaction data transmission mechanism in pre-prepare and prepare phases of the PBFT algorithm can be optimized and improved.

In one aspect, the pre-prepare message sent by the primary node device to each secondary node device no longer needs to include the complete transaction list, but includes only one data fragment of the transaction list.

In another aspect, a method used by the primary node device to transmit the pre-prepare messages to each of other secondary node devices can be changed from broadcasting the pre-prepare message(s) to sending a pre-prepare message to each secondary node device in a unicast mode. For example, respective pre-prepare messages can be constructed separately for individual secondary node devices, where the pre-prepare messages include different data fragments, and then the constructed pre-prepare messages are sent to the secondary node devices one by one, so that each secondary node device can receive a different data fragment.

Referring back to FIG. 2, the secondary node device receiving the pre-prepare message can first perform verification on the received pre-prepare message according to the PBFT algorithm, to determine whether to accept the received pre-prepare message.

In the present specification, performing verification on the received pre-prepare message is a process of performing verification on the content included in the received pre-prepare message. A specific verification process is omitted for simplicity in the present specification.

For example, according to the PBFT algorithm, the pre-prepare message can include information such as to-be-negotiated transaction data (a data fragment in accordance with the present specification), a view index number v, a digest of the to-be-negotiated transaction data (a digest of the data fragment in accordance with the present specification), a digital signature, etc. Correspondingly, in accordance with the present specification, the following verification process can be specifically used to perform verification on the pre-prepare message:

(1) Verify whether the view index number v is consistent with a locally recorded view index number.

(2) Verify the digital signature included in the pre-prepare message.

(3) Verify the validity of the data fragment included in the pre-prepare message.

For example, during implementation, the primary node device can construct a Merkle tree based on all data fragments, and add a hash value of each branch node of the Merkle tree to the pre-prepare message. When performing verification on the data fragment included in the received pre-prepare message, the node device can recalculate a hash value of the data fragment included in the pre-prepare message, and reconstruct a Merkle tree based on the hash value and the hash value of each branch node of the Merkle tree included in the pre-prepare message. Then, the node device makes a comparison using a hash value corresponding to the root of the reconstructed Merkle tree, to perform verification on the data fragment. If the hash value corresponding to the root of the reconstructed Merkle tree does not change, it is considered that the validity verification on the data fragment succeeds. Otherwise, it can be considered that the data fragment(s) included in the pre-prepare message is invalid, and in this case, the data fragment(s) can be discarded.

Certainly, in practice, content included in the pre-prepare message can also be expanded based on an actual requirement. For example, the pre-prepare message can further include a consensus height h. The consensus height h is functionally similar to the view index number v, and is usually an integer that grows consecutively, representing the number of consensus rounds (instead of representing the number of rounds of successful consensuses) in the consortium blockchain. For example, in a round of consensus, if a primary node device is faulty, an attempt to switch is usually triggered, and a primary node device is re-elected. In this case, the consensus height h can immediately increase by 1. Because this round of consensus has not been successful, the view index number v does not increase by 1, and remains unchanged at the original value of view index number v.

In this case, for the verification on the pre-prepare message, the following verification can be performed in addition to the above verification process.

(4) Verify whether the consensus height h is consistent with a locally recorded consensus height h.

With continued reference to FIG. 2, after the node device receiving the pre-prepare message performs the above verification process, if the verification succeeds, it indicates that the node device accepts the pre-prepare message. In this case, the node device can obtain and store the data fragment included in the pre-prepare message, and enter the prepare phase of the PBFT protocol, to broadcast a prepare message used to confirm the pre-prepare message to each of the other node devices in the consortium blockchain. A format of content included in the prepare message can be consistent with that of the pre-prepare message.

Based on the existing PBFT protocol, the prepare message broadcast by the node device to each of the other node devices in the consortium blockchain usually includes only such data as a view index number v and a digest of to-be-negotiated transaction data. In the present specification, the format of the prepare message can be further expanded, and each node device can also add, to the prepare message, a data fragment sent by the primary node device via the pre-prepare message in a unicast mode.

In one aspect, each node device can broadcast a prepare message including a data fragment to each of the other node devices in the consortium blockchain, to further spread and transmit, to each of the other node devices in the consortium blockchain, the received data fragment sent by the primary node device in a unicast mode.

In another aspect, each node device can also receive a prepare message broadcast by each other secondary node device, and perform verification on the received prepare message, to determine whether to accept the received prepare message. For a specific process of performing verification on the received prepare message, references can be made to the specific process of performing verification on the pre-prepare message. Details are omitted for simplicity in the present specification.

If the verification succeeds, it indicates that the node device accepts the received prepare message.

In one aspect, the node device can obtain and store a data fragment included in the prepare message.

In another aspect, the node device can further determine whether the number of received prepare messages broadcast by other node devices reaches 2f+1 (including a prepare message broadcast by the node device itself).

Herein, f represents the number of fault-tolerant nodes in the PBFT algorithm, a specific value off can be obtained through conversion according to equation N=3f+1, where N represents the total number of node devices in the consortium blockchain.

If the number of received prepare messages reaches 2f+1, the node device can enter a commit phase of the PBFT protocol. The node device can broadcast a commit message to each of the other node devices in the consortium blockchain, and continue to complete the consensus process of the original content of the transaction list.

In the present specification, after broadcasting the commit message to each of the other node devices in the consortium blockchain, the node device in the consortium blockchain can also receive commit message(s) broadcast by other node device(s), and perform verification on the received commit message(s) to determine whether to accept the received commit message(s).

In the present specification, a format of content included in the commit message can be consistent with the formats of the pre-prepare message and the prepare message. However, it should be emphasized that the digest of the to-be-negotiated transaction data included in the pre-prepare message and the prepare message is a digest of some data of the transaction list, while in the commit phase, because the node device has recovered the complete transaction list, the commit message can include a digest of the recovered complete transaction list.

For a specific process of performing verification on the received commit message, references can be made to the specific process of performing verification on the pre-prepare message. Details are omitted for simplicity in the present specification.

If the verification succeeds, it indicates that the node device accepts the received commit message, and the node device can further determine whether the number of received commit messages broadcast by other node devices reaches 2f+1 (including a commit message broadcast by the node device itself).

If the number of received commit messages reaches 2f+1, the node device can further determine whether the number of collected data fragments reaches an erasure code recovery threshold supported by the erasure code algorithm. If so, the node device can immediately perform data recovery calculation on the collected data fragments based on the erasure code reconstruction algorithm to recover the original content of the transaction list.

A specific process of performing data recovery calculation on the collected data fragments based on the erasure code reconstruction algorithm is omitted for simplicity in the present specification. A person skilled in the art can refer to descriptions in related technologies when implementing the technical solutions of the present specification.

In an illustrated implementation, once a specific value of the erasure code recovery threshold is larger than 2f+1, the secondary node device does not have sufficient data fragments in the commit phase to recover the original content of the to-be-negotiated transaction list. Therefore, in the present specification, the specific value of the erasure code recovery threshold supported by the erasure code algorithm needs to be less than or equal to 2f+1. For example, the value can be exactly equal to 2f+1.

As such, when fragmenting the transaction list based on the erasure code algorithm, the primary node device can control the final number of data fragments obtained through fragmentation based on the number f of faulty-tolerable nodes supported by the PBFT algorithm, so that data fragments obtained by fragmenting the transaction list can be as small in size as possible while it is ensured that there are sufficient data fragments to recover the original content of the to-be-negotiated transaction list in the commit phase.

In the present specification, before fragmenting the transaction list, the primary node device can further preprocess the transaction list based on a supported related algorithm.

In an illustrated implementation, before fragmenting the transaction list, the primary node device can further perform compression preprocessing on the transaction list, to perform compression on the transaction list based on a supported compression algorithm.

The compression algorithm used by the primary node device is not specifically limited in the present specification.

After completing the compression processing on the transaction list, the primary node device fragments the compressed transaction list based on the erasure code algorithm, to fragment the compressed transaction list into the specified number of data fragments.

Correspondingly, in the prepare phase of the PBFT protocol, because a data fragment transmitted by each node device is a data fragment obtained by fragmenting the compressed transaction list, the node device obtains only the compressed transaction list after performing data recovery on the collected data fragments based on the erasure code reconstruction algorithm.

In this case, after completing the data recovery calculation, the node device can perform decompression processing on the recovered compressed transaction list based on a decompression algorithm corresponding to the compression algorithm, to obtain the original content of the transaction list through decompression, and then continue to perform the consensus process of the commit phase. Specific implementation details are omitted for simplicity.

As such, before fragmenting the transaction list, the primary node device performs compression processing on the transaction list in advance, so that a size of a compressed data fragment can be effectively reduced, and data transmission bandwidth for performing consensus interaction between the primary node device and the secondary node devices can be reduced to the greatest extent.

In another illustrated implementation, before fragmenting the transaction list, the primary node device can further perform encryption preprocessing on the transaction list, to perform encryption on the transaction list based on a predetermined encryption algorithm and an encryption key.

The encryption algorithm used by the primary node device is not specifically limited in the present specification. For example, in practice, the encryption algorithm can be a symmetric encryption algorithm, or can be an asymmetric encryption algorithm.

After completing the encryption processing on the transaction list, the primary node device fragments the encrypted transaction list based on the erasure code algorithm, to fragment the encrypted transaction list into the specified number of data fragments.

Correspondingly, in the prepare phase of the PBFT protocol, because a data fragment transmitted by each node device is a data fragment obtained by fragmenting the encrypted transaction list, the node device obtains only the encrypted transaction list after performing data recovery on the collected data fragments based on the erasure code reconstruction algorithm.

In this case, after completing the data recovery calculation, the node device can perform decryption processing on the recovered encrypted transaction list based on a decompression algorithm corresponding to the compression algorithm and a decryption key corresponding to the encryption key, to obtain the original content of the transaction list through decryption, and then continue to perform the consensus process of the commit phase. Specific implementation details are omitted for simplicity.

In an illustrated implementation, the encryption algorithm can be specifically a threshold encryption algorithm. The decryption algorithm can be specifically a threshold decryption algorithm corresponding to the threshold encryption algorithm.

In this scenario, the decryption key can be specifically fragmented into a specified number of sub-keys, and each of the sub-keys is held by a respective node device.

It should be noted that the number of sub-keys obtained by fragmenting the decryption key can be consistent with the total number of node devices in the consortium blockchain. For example, assuming that there are N node devices in the consortium blockchain, the decryption key can be fragmented into N sub-keys, each held by one of the N node devices in the consortium blockchain, respectively.

In this case, the node device can further collect sub-keys held by other node devices, and determine whether the number of collected sub-keys reaches a predetermined decryption threshold. For example, when the decryption threshold is N, it indicates that N node devices need to jointly decrypt encrypted data based on the sub-keys (namely, a part of the decryption key) they hold.

A specific method used by the node device to collect the sub-keys held by the other node devices is not specifically limited in the present specification.

For example, the consensus algorithm used in the consortium blockchain is still the PBFT algorithm. The node device can add a sub-key held by the node device to a commit message exchanged with another node device. Certainly, in practice, node devices can separately define an interactive message used to transmit sub-keys they hold, and synchronize the sub-key held by one node device to another node device by using the interactive message.

If the number of sub-keys collected by the node device reaches the predetermined decryption threshold, it indicates that the node device has sufficient fragments to reconstruct the decryption key. In this case, the node device can perform reconstruction processing on the decryption key based on the collected sub-keys to recover the original decryption key, and then perform decryption processing on the recovered encrypted transaction list based on the threshold decryption algorithm and the recovered original decryption key, to obtain the original content of the transaction list through decryption.

A specific process of reconstructing the decryption key based on the collected sub-keys is omitted for simplicity in the present specification. A person skilled in the art can refer to descriptions in related technologies when implementing the technical solutions of the present specification.

For example, fragmenting the decryption key and recovering the decryption key based on the collected sub-keys can also be implemented by using an erasure code technology. A specific process is omitted for simplicity.

As such, before fragmenting the transaction list, the primary node device performs encryption processing on the transaction list in advance, so that data security of sending a data fragment by the primary node device to each node device can be effectively improved, and some unauthorized node devices cannot view the original content of the transaction list even if they collect sufficient data fragments to recover the transaction list, thereby improving data security of consensus interaction between the primary node device and the secondary node devices.

It should be further noted that, in the above implementation, detailed descriptions are provided by using the example where the existing transaction data transmission and spreading mechanism in the pre-prepare and prepare phases of the PBFT algorithm is used to transmit and spread the to-be-negotiated transaction list to each node device participating in the consensus.

It should be emphasized that, in practice, when the to-be-negotiated transaction list needs to be transmitted and spread to each node device participating in the consensus, in addition to or instead of using the existing transmission and spreading mechanism in the consensus algorithm equipped on the consortium blockchain to transmit and spread the transaction list, a separate transmission and spread protocol can be defined to perform the same function.

For example, the consensus algorithm used in the consortium blockchain is still the PBFT algorithm. Before the primary node device and the secondary node devices start the consensus interaction of three phases specified in the PBFT algorithm, the primary node device can perform consensus interaction with the secondary node devices by using a defined transmission and spread protocol, to transmit and spread the to-be-negotiated transaction list to the secondary node devices in advance. In other words, the node device can transmit and spread the to-be-negotiated transaction list to each node device participating in the consensus by using the defined transmission and spread protocol, and then start the consensus interaction of three phases specified in the PBFT algorithm, to complete the consensus processing on the transaction list.

In this case, the existing transaction data transmission mechanism in the pre-prepare and prepare phases of the PBFT algorithm does not need to optimized as described in the above implementation(s). For example, the pre-prepare message and the prepare message no longer need to include the complete transaction list or a data fragment of the transaction list, but can directly include the digest value of the transaction list.

In addition, in the above implementation, only the PBFT algorithm is used as an example of the consensus algorithm in the consortium blockchain for description. Clearly, in practice, the technical solutions of the present specification can also be applied to other forms of consensus algorithm used in the consortium blockchain.

In other words, the transmission logic shown in steps 102 to 106 can be applied to other similar consensus algorithms such as a raft algorithm besides the PBFT algorithm. Specific implementation details are omitted for simplicity in the present specification. A person skilled in the art can refer to the descriptions in the above implementation when implementing the technical solutions of the present specification.

It can be learned from the above implementations that when proposing the to-be-negotiated transaction data to the secondary node devices, the primary node device can fragment the to-be-negotiated transaction data based on the erasure code algorithm before transmission.

As such, in one aspect, at the time when the primary node device proposes the transaction data to the secondary node devices, the primary node device no longer needs to broadcast the complete transaction data to the secondary node devices, but can send data fragment(s) to each secondary node device in a unicast mode. Thus, data transmission bandwidth consumed for transmitting the to-be-negotiated transaction data to the node devices participating in the consensus can be significantly reduced, and the to-be-negotiated transaction data can be transmitted to the secondary node devices in a short time to complete the consensus, thereby improving consensus processing efficiency.

In another aspect, because the primary node device sends only data fragment(s) of the transaction data to each secondary node device in a unicast mode, the primary node device cannot learn of the complete content of a complete transaction that the data fragment belongs. Therefore, the following case can be effectively avoided: The primary node device selectively sends some specific transactions to other node device(s) participating in the consensus in a unicast mode, and conducts a selective consensus on some specific transactions. As such, fairness of the consensus can be ensured, and the primary node device can be prevented from doing "evil" through the selective consensus.

Corresponding to the above method implementation, the present specification further provides an implementation of an apparatus for blockchain-based transaction consensus processing. The implementation of the apparatus for blockchain-based transaction consensus processing in the present specification can be applied to an electronic device. The apparatus implementation can be implemented by software, hardware, or a combination of hardware and software. Software implementation is used as an example. As a logical apparatus, the apparatus is formed by reading corresponding computer program instructions in a non-volatile storage device to a memory by a processor of an electronic device where the apparatus is located. In terms of hardware, FIG.

3 is a hardware diagram illustrating a structure of an electronic device where the apparatus for blockchain-based transaction consensus processing is located in accordance with the present specification. In addition to a processor, a memory, a network interface, and a non-volatile storage device shown in FIG. 3, the electronic device where the apparatus is located in accordance with the implementations can usually include other hardware based on an actual function of the electronic device. Details are omitted for simplicity.

Figure 4:
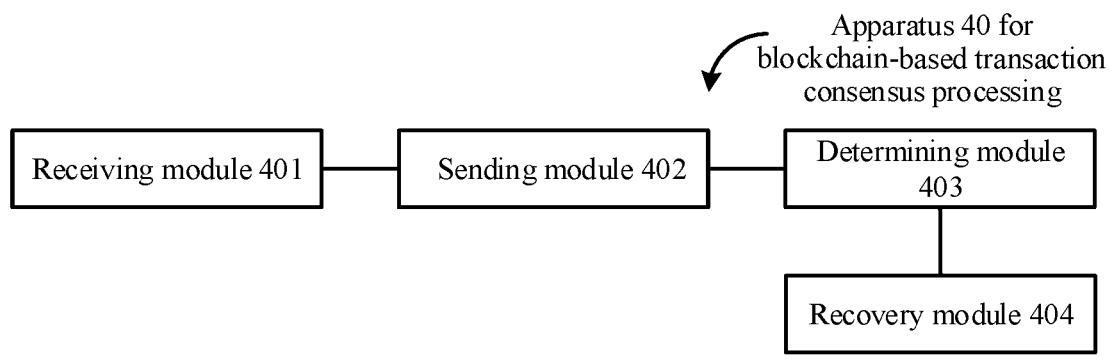
FIG. 4 is a block diagram illustrating an apparatus for blockchain-based transaction consensus processing, according to an example implementation.

FIG. 4 is a block diagram illustrating an apparatus for blockchain-based transaction consensus processing, according to an example implementation of the present specification.

Figure 3:
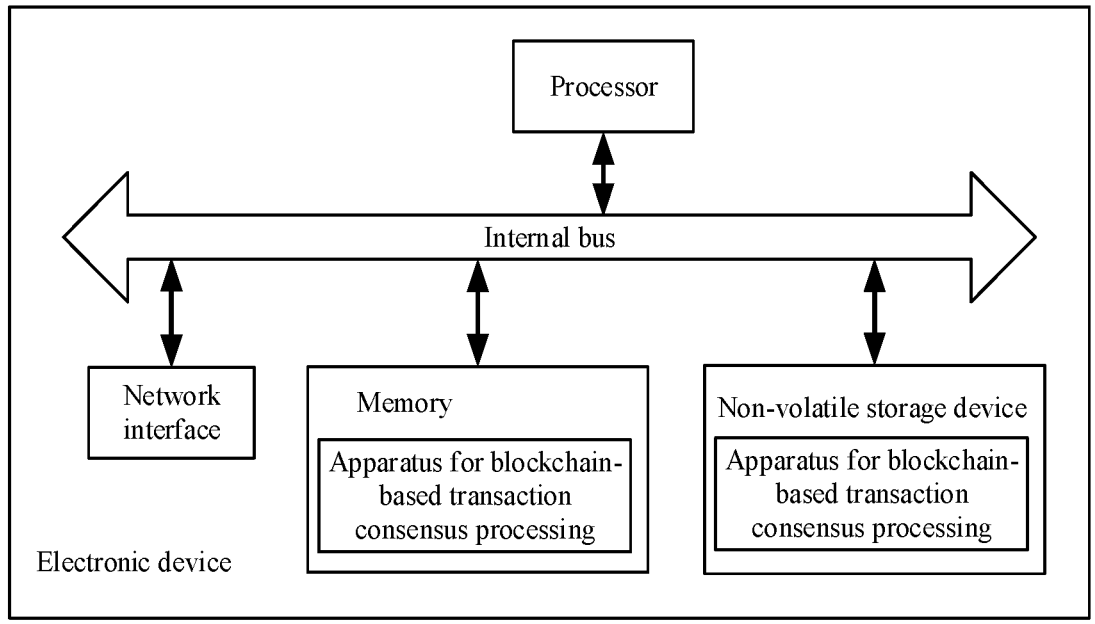
FIG. 3 is a schematic diagram illustrating a structure of an electronic device, according to an example implementation.

Referring to FIG. 4, the apparatus 40 for blockchain-based transaction consensus processing can be applied to the above electronic device shown in FIG. 3, and includes a receiving module 401, a sending module 402, a determining module 403, and a recovery module 404.

The receiving module 401 is configured to receive a data fragment of transaction data that is sent by a primary node device in a unicast mode, where node devices in a blockchain include at least one primary node device and several secondary node devices, the primary node device fragments the proposed transaction data into a specified number of data fragments, and respective data fragments sent by the primary node device to individual node devices in a unicast mode are different from one another;

the sending module 402 is configured to broadcast the received data fragment to other node devices in the blockchain, and receive data fragments of the transaction data that are broadcast by the other node devices;

the determining module 403 is configured to determine whether the number of received data fragments of the transaction data reaches an erasure code recovery threshold; and the recovery module 404 is configured to: if so, perform data recovery on the received data fragments based on an erasure code reconstruction algorithm to obtain original content of the transaction data, to complete consensus processing with respect to the original content of the transaction data.

In this implementation, the apparatus 40 further includes:

a fragmentation module 405, configured to determine whether the current node device is elected as the primary node device; and if so, fragment the proposed transaction data into the specified number of data fragments based on the erasure code algorithm; and the sending module 402 is further configured to:
separately send the specified number of data fragments to each of the other node devices in a unicast mode.

In this implementation, a consensus algorithm equipped on the blockchain is a PBFT algorithm; and
the receiving module 401 is configured to:
receive a pre-prepare message sent by the primary node device in a unicast mode, where the pre-prepare message includes a data fragment of the transaction data; and
obtain and store the data fragment included in the pre-prepare message.

In this implementation, the sending module 402 is configured to:
broadcast a prepare message to the other node devices in the blockchain, where the prepare message includes the received data fragment, so that when receiving the prepare message, the other node devices obtain and store the data fragment included in the prepare message.

In this implementation, the fragmentation module 405 is configured to:
perform compression processing on the proposed transaction data based on a predetermined compression algorithm;
fragment the compressed transaction data into the specified number of data fragments based on the erasure code algorithm; and
the recovery module 404 is configured to:
perform data recovery on the received data fragments based on the erasure code reconstruction algorithm, to obtain the compressed transaction data; and
perform decompression processing on the recovered transaction data based on a decompression algorithm corresponding to the compression algorithm, to obtain the original content of the transaction data.

In this implementation, the fragmentation module 405 is configured to:
perform encryption processing on the proposed transaction data based on a predetermined encryption algorithm and an encryption key;
fragment the encrypted transaction data into the specified number of data fragments based on the erasure code algorithm; and
the recovery module 404 is configured to:
perform data recovery on the received data fragments based on the erasure code reconstruction algorithm, to obtain the encrypted transaction data; and
perform decryption processing on the recovered transaction data based on a decryption algorithm corresponding to the encryption algorithm and a decryption key corresponding to the encryption key, to obtain the original content of the transaction data.

In this implementation, the encryption algorithm is a threshold encryption algorithm, the decryption algorithm is a threshold decryption algorithm corresponding to the threshold encryption algorithm, the decryption key is fragmented into a specified number of sub-keys, and each of the sub-keys is held by a respective node device.

The recovery module 404 is further configured to: collect sub-keys held by the other node devices;
determine whether the number of collected sub-keys reaches a predetermined decryption threshold; and
if so, reconstruct the decryption key based on the collected sub-keys, and perform decryption processing on the recovered transaction data based on the threshold decryption algorithm corresponding to the threshold encryption algorithm and the decryption key.

In this implementation, the transaction data proposed by the primary node device is a transaction list constructed using to-be-negotiated transactions broadcast by user clients in a current consensus period of the primary node device, and the specified number is a total number of node devices in the blockchain.

In this implementation, the blockchain is a consortium blockchain.

For an implementation process of functions and roles of each module in the apparatus, references can be made to an implementation process of a corresponding step in the above method. Details are omitted herein for simplicity.

Because apparatus implementations basically correspond to method implementations, for related parts, references can be made to related descriptions in the method implementations. The above apparatus implementations are merely examples. The modules described as separate parts may or may not be physically separate, and parts displayed as modules may or may not be physical modules, and can be located in one position, or can be distributed on a plurality of network modules. Some or all of the modules can be selected based on actual requirements to achieve the objectives of the solutions of the present specification. A person of ordinary skill in the art can understand and implement the implementations of the present specification without making innovative efforts.

The system, apparatus, or module illustrated in the above implementations can be specifically implemented by using a computer chip or an entity, or can be implemented by using a product having a certain function. A typical implementation device is a computer, and the computer can be specifically a personal computer, a laptop computer, a cellular phone, a camera phone, a smartphone, a personal digital assistant, a media player, a navigation device, an email receiving and sending device, a game console, a tablet, a wearable device, or any combination of these devices.

Corresponding to the above method implementation, the present specification further provides an implementation of an electronic device. The electronic device includes a processor and a memory configured to store machine-executable instructions. The processor and the memory are usually connected to each other by using an internal bus. In other possible implementations, the device can further include an external interface for communication with another device or component.

In this implementation, by reading and executing the machine-executable instructions stored in the memory and corresponding to control logic of blockchain-based transaction consensus processing, the processor is configured to:

receive a data fragment of transaction data that is sent by a primary node device in a unicast mode, where node devices in a blockchain include at least one primary node device and several secondary node devices, the primary node device fragments the proposed transaction data into a specified number of data fragments, and respective data fragments sent by the primary node device to individual node devices in a unicast mode are different from one another;

broadcast the received data fragment to other node devices in the blockchain, and receive data fragments of the transaction data that are broadcast by the other node devices;

determine whether the number of received data fragments of the transaction data reaches an erasure code recovery threshold; and if so, perform data recovery on the received data fragments based on an erasure code reconstruction algorithm to obtain original content of the transaction data, to complete consensus processing with respect to the original content of the transaction data.

In this implementation, by reading and executing the machine-executable instructions stored in the memory and corresponding to control logic of blockchain-based transaction consensus processing, the processor is configured to:

determine whether a current node device is elected as the primary node device;

if so, fragment the proposed transaction data into the specified number of data fragments based on the erasure code algorithm; and separately send the specified number of data fragments to each of the other node devices in a unicast mode.

In this implementation, a consensus algorithm equipped on the blockchain is a PBFT algorithm.

By reading and executing the machine-executable instructions stored in the memory and corresponding to control logic of blockchain-based transaction consensus processing, the processor is configured to:

receive a pre-prepare message sent by the primary node device in a unicast mode, where the pre-prepare message includes a data fragment of the transaction data; and obtain and store the data fragment included in the pre-prepare message.

In this implementation, by reading and executing the machine-executable instructions stored in the memory and corresponding to control logic of blockchain-based transaction consensus processing, the processor is configured to:

broadcast a prepare message to the other node devices in the blockchain, where the prepare message includes the received data fragment, so that when receiving the prepare message, the other node devices obtain and store the data fragment included in the prepare message.

In this implementation, by reading and executing the machine-executable instructions stored in the memory and corresponding to control logic of blockchain-based transaction consensus processing, the processor is configured to:

perform compression processing on the proposed transaction data based on a predetermined compression algorithm; and fragment the compressed transaction data into the specified number of data fragments based on the erasure code algorithm.

In this implementation, by reading and executing the machine-executable instructions stored in the memory and corresponding to control logic of blockchain-based transaction consensus processing, the processor is configured to:

perform data recovery on the received data fragments based on the erasure code reconstruction algorithm, to obtain the compressed transaction data; and perform decompression processing on the recovered transaction data based on a decompression algorithm corresponding to the compression algorithm, to obtain the original content of the transaction data.

In this implementation, by reading and executing the machine-executable instructions stored in the memory and corresponding to control logic of blockchain-based transaction consensus processing, the processor is configured to:

perform encryption processing on the proposed transaction data based on a predetermined encryption algorithm and an encryption key; and fragment the encrypted transaction data into the specified number of data fragments based on the erasure code algorithm.

In this implementation, by reading and executing the machine-executable instructions stored in the memory and corresponding to control logic of blockchain-based transaction consensus processing, the processor is configured to:

perform data recovery on the received data fragments based on the erasure code reconstruction algorithm, to obtain the encrypted transaction data; and perform decryption processing on the recovered transaction data based on a decryption algorithm corresponding to the encryption algorithm and a decryption key corresponding to the encryption key, to obtain the original content of the transaction data.

In this implementation, the encryption algorithm is a threshold encryption algorithm, the decryption algorithm is a threshold decryption algorithm corresponding to the threshold encryption algorithm, the decryption key is fragmented into a specified number of sub-keys, and each of the sub-keys is held by a respective node device.

By reading and executing the machine-executable instructions stored in the memory and corresponding to control logic of blockchain-based transaction consensus processing, the processor is configured to:

collect sub-keys held by the other node devices;

determine whether the number of collected sub-keys reaches a predetermined decryption threshold; and if so, reconstruct the decryption key based on the collected sub-keys, and perform decryption processing on the recovered transaction data based on the threshold decryption algorithm corresponding to the threshold encryption algorithm and the decryption key.

To provide further context for embodiments of this specification, and as introduced herein, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical Byzantine fault tolerance (PBFT) consensus, described in further detail below.

Figure 5:
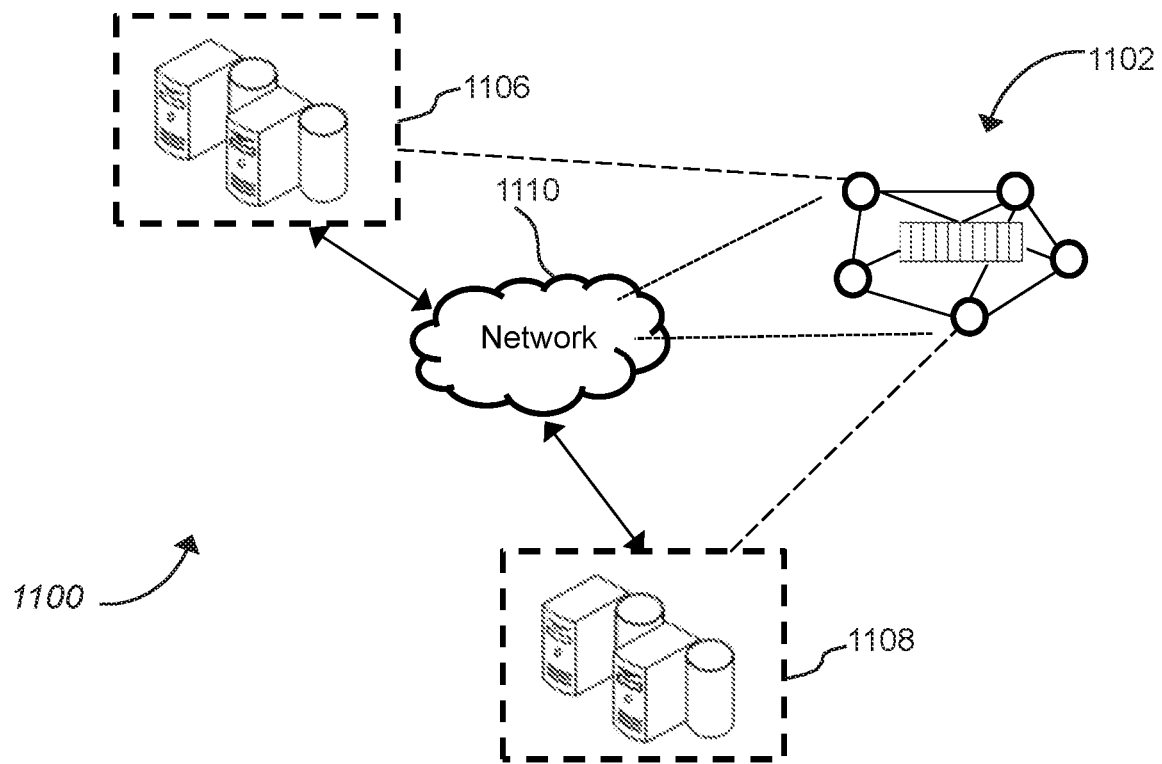
FIG. 5 is a diagram illustrating example environments that can be used to execute embodiments of this specification.

FIG. 5 is a diagram illustrating an example of an environment 1100 that can be used to execute embodiments of this specification. In some examples, the environment 1100 enables entities to participate in a consortium blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the consortium blockchain network 1102. In general the network 1110 represents one or more communication networks. In some cases, the network 1110 includes network hardware such as switches, routers, repeaters, electrical cables and optical fibers, light emitters and receivers, radio transmitters and receivers, and the like. In some cases, the computing devices 1106, 1108 can be nodes of a cloud computing system (not shown), or each computing device 1106, 1108 can be a separate cloud computing system including a number of computers interconnected by a network and functioning as a distributed processing system.

In the depicted example, the computing systems 1106, 1108 can each include any appropriate computing system that enables participation as a node in the consortium blockchain network 1102. Examples of computing devices include, without limitation, a server, a desktop computer, a laptop computer, a tablet computing device, and a smartphone. In some examples, the computing systems 1106, 1108 host one or more computer-implemented services for interacting with the consortium blockchain network 1102. For example, the computing system 1106 can host computer-implemented services of a first entity (user A), such as a transaction management system that the first entity uses to manage its transactions with one or more other entities (other users). The computing system 1108 can host computer-implemented services of a second entity (user B), such as a transaction management system that the second entity uses to manage its transactions with one or more other entities (other users). In the example of FIG. 5, the consortium blockchain network 1102 is represented as a peer-to-peer network of nodes, and the computing systems 1106, 1108 provide nodes of the first entity and second entity, respectively, which participate in the consortium blockchain network 1102.

Figure 6:
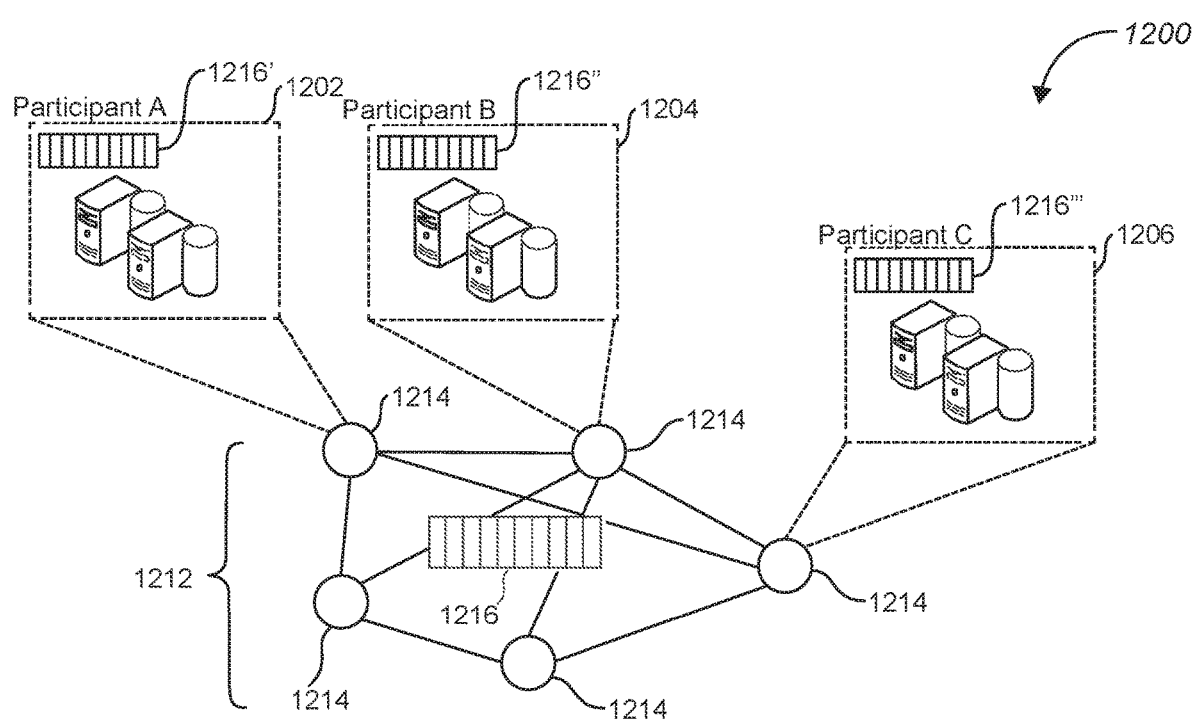
FIG. 6 is a diagram illustrating an example architecture in accordance with embodiments of this specification.

FIG. 6 depicts an example architecture 1200 in accordance with embodiments of this specification. The example architecture 1200 includes participant systems 1202, 1204, 1206 that correspond to Participant A, Participant B, and Participant C, respectively. Each participant (user, enterprise, etc.) participates in a blockchain network 1212 provided as a peer-to-peer network including a plurality of nodes 1214, at least some of which immutably record information in a blockchain 1216. Although a single blockchain 1216 is schematically depicted within the blockchain network 1212, multiple copies of the blockchain 1216 are provided, and are maintained across the blockchain network 1212, as described in further detail herein.

In the depicted example, each participant system 1202, 1204, 1206 is provided by, or on behalf of, Participant A, Participant B, and Participant C, respectively, and functions as a respective node 1214 within the blockchain network

1212. As used herein, a node generally refers to an individual system (computer, server, etc.) that is connected to the blockchain network 1212, and enables a respective participant to participate in the blockchain network. In the example of FIG. 6, a participant corresponds to each node 1214. It is contemplated, however, that a participant can operate multiple nodes 1214 within the blockchain network 1212, and/or multiple participants can share a node 1214. In some examples, the participant systems 1202, 1204, 1206 communicate with, or through, the blockchain network 1212 using a protocol (hypertext transfer protocol secure (HTTPS)), and/or using remote procedure calls (RPCs).

Nodes 1214 can have varying degrees of participation within the blockchain network 1212. For example, some nodes 1214 can participate in the consensus process (as miner nodes that add blocks to the blockchain 1216), while other nodes 1214 do not participate in the consensus process. As another example, some nodes 1214 store a complete copy of the blockchain 1216, while other nodes 1214 only store copies of portions of the blockchain 1216. For example, data access privileges can limit the blockchain data that a respective participant stores within its respective system. In the example of FIG. 6, the participant systems 1202, 1204 store respective, complete copies 1216', 1216'', 1216''' of the blockchain 1216. In the descriptions herein, nodes 1214 of the blockchain network 1212 are also referred to as "participant user" for descriptive purposes. In some embodiments, some or all of the participant users 1214 participate in the consensus process and are referred to as "consensus nodes". The consensus nodes for the blockchain 1216 may also include other nodes not selected from the participant users 1214. In some other embodiments, consensus nodes for adding blocks to the blockchain 1216 do not overlap with the participant users 1214 that propose blocks to be added to the blockchain 1216.

A blockchain, such as the blockchain 1216 of FIG. 6, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 1212 or different blockchains 1216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 6, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 6, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some embodiments, a logistics management system can be implemented within the blockchain environment 1100 of FIG. 5 and using the blockchain architecture 1200 of FIG. 6. For example, transaction information of a logistic process is stored as blocks in the blockchain 1216.

A person skilled in the art can easily figure out other implementations of the present specification after thinking over the present specification and practicing the present disclosure herein. The present specification is intended to cover any variations, uses, or adaptations of the present specification, and these variations, uses, or adaptations follow the general principles of the present specification and include common knowledge or conventional techniques that are not disclosed in the technical field of the present specification. The present specification and the implementations are merely considered as examples, and the actual scope and the spirit of the present specification are pointed out by the following claims.

It should be understood that the present specification is not limited to the precise structures that have been described above and shown in the drawings, and various modifications and changes can be made without departing from the scope of the present specification. The scope of the present specification is limited by the appended claims only.

The above descriptions are merely preferred implementations of the present specification, but are not intended to limit the present specification. Any modification, equivalent replacement, or improvement made without departing from the spirit and principle of the present specification shall fall within the protection scope of the present specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
   receiving, at a node of a blockchain network and from one or more nodes of the blockchain network, data fragments of proposed transaction data;
   determining that a number of the data fragments of the proposed transaction data that have been received by the node, including a first data fragment received via a unicast mode and a second data fragments received via a broadcast mode, reaches an erasure code recovery threshold; and
   in response to determining that the number of the data fragments of the proposed transaction data reaches the erasure code recovery threshold, performing data recovery on the data fragments that have been received by the node based, at least in part, on an erasure code reconstruction algorithm to obtain original content of the proposed transaction data.

2. The method of claim 1, wherein the node of the block chain receives the first data fragment from an elected primary node of the blockchain network.

3. The method of claim 2, wherein the node of the block chain receives a third data fragment from the elected primary node via the unicast mode.

4. The method of claim 1, further comprising sending, by the node of the blockchain, the first data fragment to nodes of the blockchain network via the broadcast mode.

5. The method of claim 1, further comprising sending, by the node of the blockchain, the second data fragment to nodes of the blockchain network via the broadcast mode.

6. The method of claim 1, wherein a consensus algorithm of the blockchain network is a practical Byzantine fault tolerance (PBFT) algorithm and wherein the method further comprises:
   receiving a pre-prepare message sent via unicast mode, wherein the pre-prepare message includes the first data fragment.

7. The method of claim 1, wherein the proposed transaction data is fragmented into different data fragments including the first data fragment and the second data fragments, in accordance with a total number of nodes in the blockchain network.

8. A non-transitory computer-readable medium storing contents that, when executed by one or more processors, cause the one or more processors to perform actions comprising:
- receiving, at a node of a blockchain network and from one or more nodes of the blockchain network, data fragments of proposed transaction data;
- determining that a number of the data fragments of the proposed transaction data that have been received by the node reaches an erasure code recovery threshold; and
- in response to determining that the number of the data fragments of the proposed transaction data reaches the erasure code recovery threshold, performing data recovery on the data fragments that have been received by the node based, at least in part, on an erasure code reconstruction algorithm to obtain original content of the proposed transaction data.

9. The computer-readable medium of claim 8, wherein the node of the block chain receives a first data fragment of the data fragments from an elected primary node of the blockchain network.

10. The computer-readable medium of claim 8, wherein the data fragments include a data fragment received via a unicast mode and a data fragment received via a broadcast mode.

11. The computer-readable medium of claim 8, wherein the actions further comprise sending, by the node of the blockchain, one or more of the data fragments to nodes of the blockchain network via a broadcast mode.

12. The computer-readable medium of claim 8, wherein the data fragments include data fragments received from a plurality of elected primary nodes of the blockchain network.

13. The computer-readable medium of claim 8, wherein a consensus algorithm of the blockchain network is a practical Byzantine fault tolerance (PBFT) algorithm and wherein the actions further comprise:
- receiving a pre-prepare message sent via unicast mode, wherein the pre-prepare message includes a data fragment.

14. The computer-readable medium of claim 8, wherein the proposed transaction data is fragmented into different data fragments in accordance with a total number of nodes in the blockchain network.

15. A system, comprising:
one or more processors; and
memory storing contents that, when executed by the one or more processors, cause the system to perform actions comprising:
- receiving, at a node of a blockchain network and from nodes of the blockchain network, data fragments of proposed transaction data;
- determining that a number of the data fragments of the proposed transaction data that have been received by the node, including a first data fragment received from an elected primary node of the blockchain network and a second data fragment received from a secondary node of the blockchain network, reaches an erasure code recovery threshold; and
- in response to determining that the number of the data fragments of the proposed transaction data reaches the erasure code recovery threshold, performing data recovery on the data fragments that have been received by the node based, at least in part, on an erasure code reconstruction algorithm to obtain original content of the proposed transaction data.

16. The system of claim 15, wherein the node of the block chain receives the first data fragment via a unicast mode.

17. The system of claim 16, wherein the node of the block chain receives a third data fragment from the elected primary node via the unicast mode.

18. The system of claim 15, wherein the actions further comprise sending, by the node of the blockchain, the first data fragment to nodes of the blockchain network via the broadcast mode.

19. The system of claim 15, wherein the actions further comprise sending, by the node of the blockchain, the second data fragment to nodes of the blockchain network via the broadcast mode.

20. The system of claim 15, wherein a consensus algorithm of the blockchain network is a practical Byzantine fault tolerance (PBFT) algorithm and wherein the actions further comprise:
- receiving a pre-prepare message sent via unicast mode, wherein the pre-prepare message includes the first data fragment.

* * * * *